United States Patent [19]
Hori

[11] Patent Number: 4,916,475
[45] Date of Patent: Apr. 10, 1990

[54] CAMERA HAVING ZOOM LENS AND VARIABLE ILLUMINATION ANGLE STROBE

[75] Inventor: Masakatsu Hori, Tokyo, Japan

[73] Assignee: Asahi Kogaku Kogyo K.K., Tokyo, Japan

[21] Appl. No.: 369,647

[22] Filed: Jun. 21, 1989

Related U.S. Application Data

[63] Continuation of Ser. No. 236,222, Aug. 25, 1988, abandoned.

[30] Foreign Application Priority Data

Aug. 29, 1987 [JP] Japan ................................ 62-214791

[51] Int. Cl.⁴ ......................... G03B 3/00; G03B 15/03
[52] U.S. Cl. ................................. 354/419; 354/149.1; 354/195.1
[58] Field of Search ............... 354/413, 419, 126, 141, 354/145.1, 149.1, 149.11, 195.1

[56] References Cited

U.S. PATENT DOCUMENTS 3,798,668  3/1974  Hartmann ....................... 354/149.1
4,734,733  3/1988  Clapp et al. .................... 354/419 X

*Primary Examiner*—Michael L. Gellner
*Attorney, Agent, or Firm*—Sandler & Greenblum

[57] ABSTRACT

A camera including a variable illuminating angle strobe device, includes a zoom lens which has a group of variable power lenses for stepwise or successively varying the focal length; a light emmitter which has a condenser lens, a light emitting tube and a reflecting shade and which is movable between a received position in which the light emitter is received in a camera body and a projected position in which the light emitter projects from the camera body; and an illuminating angle varying mechanism which varies a relative position of the condenser lens, the light emitting tube or reflecting shade in accordance with the change in the focal length of the zoom lens to vary the illuminating angle, regardless of the position of the light emitter.

31 Claims, 4 Drawing Sheets

CAMERA HAVING ZOOM LENS AND VARIABLE ILLUMINATION ANGLE STROBE

This is a continuation of application Ser. No. 236,222 filed on Aug. 25, 1988, now abandoned.

BACKGROUND OF THE INVENTION

1. Field of the Invention

The present invention relates to a camera having a zoom lens and a variable illuminating angle.stroboscopic device and, more particularly it relates to a camera having a variable illuminating angle stroboscopic device in which the illuminating angle varies in accordance with the focal length of the zoom lens.

2. Description of Related Art

There are various known lens shutter types of cameras having an automatic focus adjusting device. However, usually, in the conventional lens shutter type of camera, the focal length of a photographing optical system of such a camera can typically not be varied. A lens shutter type of camera in which a focal length adjusting lens is retractably inserted in the photographing optical system to provide two focal lengths is also known. However, in this type of camera having two focal lengths, only two focal lengths, such as a wide angle and telephoto, or a standard and a telephoto, can be used and no intermediate focal length range between the two focal lengths can be covered. This is why photographing using a zoom lens is practically limited to a single-lens reflex camera.

However, the single-lens reflex camera is more expensive and heavier than the lens shutter type of camera. The heavy weight, particularly, is disliked by relatively new and young camera users. Female users, especially do not like to carry a single-lens reflex camera on a trip (especially an overseas trip where having light baggage is desirable) because this type of camera is large and heavy. This is true even when they recognize that beautiful and clear pictures can be taken by the single-lens reflex camera.

Under these circumstances, users would choose either a light and small camera which however can not vary the focal length or a lens shutter type of camera in which only two focal lengths can be selected.

In other words, it has been commonly accepted that no change of focal length can be effected, or only two different focal lengths can be selected, in existing lens shutter type of cameras. Users accept the disadvantages when they buy a lens shutter type of camera.

The assignee of the present application has proposed a lens shutter type of camera having a zoom lens which can intermittently or successibly vary the focal length to provide more than three different focal lengths and a variable illuminating angle stroboscopic device which varies the illuminating angle in accordance with the change of the focal length of the zoom lens, as disclosed in U.S. Ser. No. 144,030 (PCT/JP87/00293). Japanese Patent Publication No. 54-50324 also disclosed this type of stroboscopic device.

In the lens shutter type of camera newly developed by the assignee of the present application and available on the market, the variable illuminating angle stroboscopic device incorporated in the camera has a light emitter secured to a camera body and, accordingly, the furthest distance that can exist between the optical axis of the strobe and the optical axis of the photographing lens is restricted within a certain limit. This is to avoid the so-called "red-eye" phenomenon that sometimes occurs during strobe photographing of figures. The "red-eye" phenomenon is a phenomenon in which a pupil of an eye of a figure appears red in a pictures because of red light reflected by a blood vessel in an eye ball. This occurs when the optical axis of the strobe device is incident upon the eye ball through a pupil, that is, typically, when the optical axis of the photographing lens and the optical axis of the strobe device are closely located.

SUMMARY OF THE INVENTION

The primary object of the present invention is to provide a camera having a zoom lens and a variable illuminating angle strobe device, in which the illuminating angle can be varied in accordance with the change of the focal length of the zoom lens, where the light emitter of the strobe device can be moved far away from the optical axis of the photographing lens so as to prevent the occurrence of the red-eye phenomenon.

To achieve the object mentioned above, according to the present invention, there is provided a camera having a zoom lens having a group of variable power lenses for stepwise or continuously changing the focal length thereof; a light emitter which has a light condenser lens, a light emitting tube, a reflecting shade and which is movable between a retracted position and a projecting position with respect to a camera body; and an illuminating angle varying mechanism which varies the relative position between the light condenser lens, the light emitting tube or the reflecting shade to vary the illuminating angle in accordance with the focal length of the zoom lens, independently of the position of the light emitter in the retracted position or in the projecting position.

With this arrangement, the light emitter of the variable illuminating angle strobe device can be moved to the projecting position far from the optical axis of the zoom lens, so that the red-eye phenomenon can not take place.

BRIEF DESCRIPTION OF DRAWINGS

The invention will be explained below in detail with reference to the accompanying drawings, in which.

DETAILED DESCRIPTION OF THE INVENTION

Figure 1:
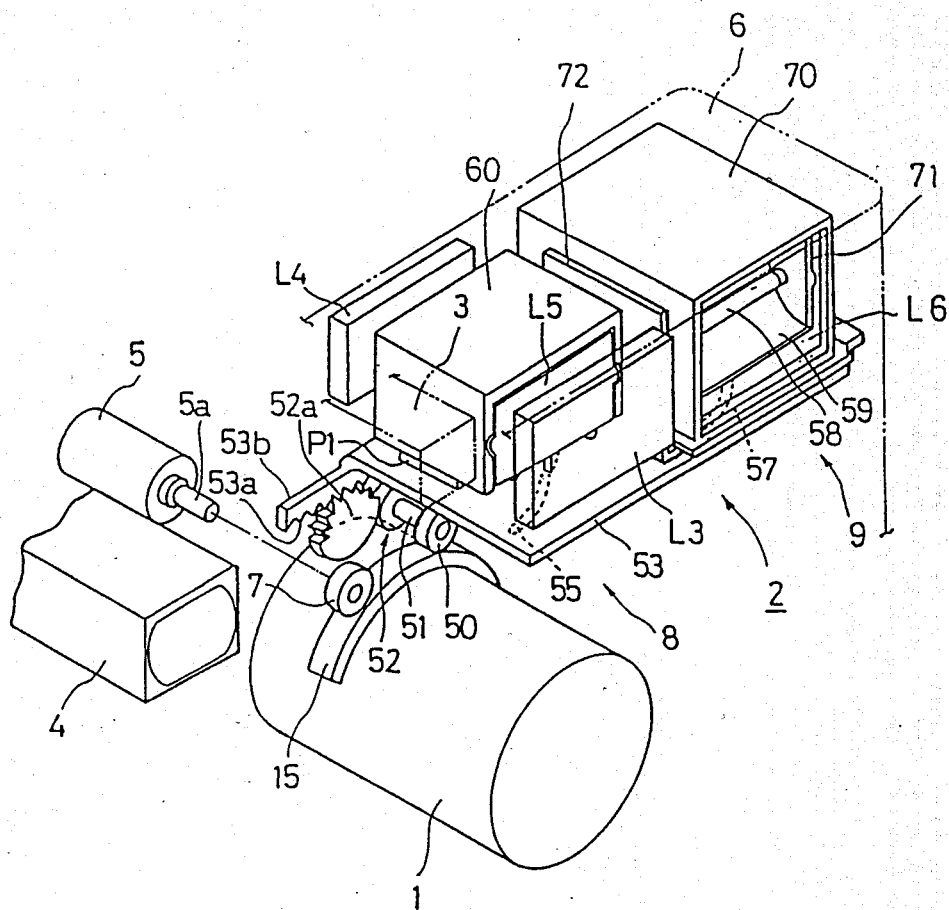
FIG. 1 is a schematic perspective view of a main part of a lens shutter type of camera according to an embodiment of the present invention.

A lens shutter type of zoom lens camera according to one aspect of the present invention has a lens barrel block 1 of a zoom lens, a finder and strobe block 2 (which will hereinafter be referred to as a strobe block), a light emitter 3 and a light receiver 4, of an object distance measuring device (AF device), and a zoom motor 5 for zooming operation. These elements are secured to a securing portion (not shown) of a camera body 6, as shown in FIG. 1.

Figure 6:
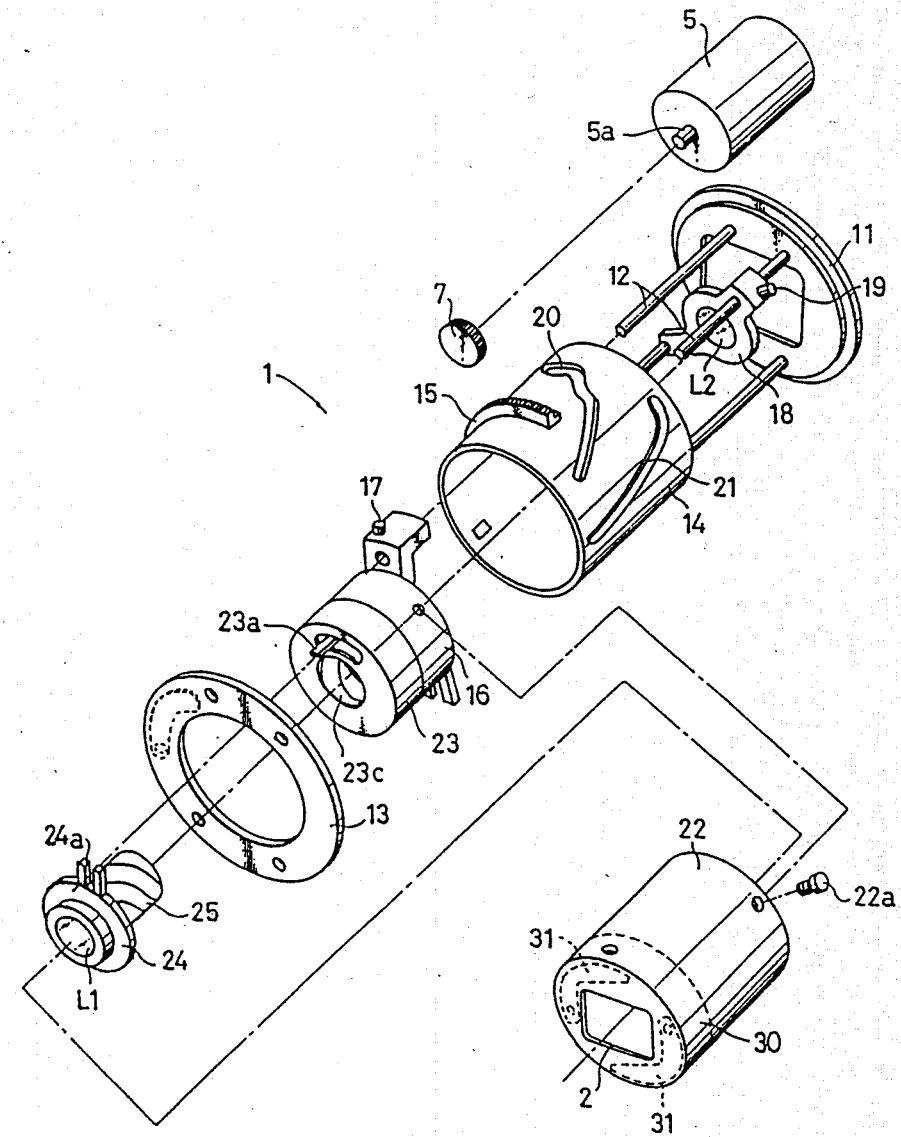
FIG. 6 is an exploded perspective view of a lens barrel block shown in FIG. 1.

The lens barrel block 1 (FIG. 6) which is driven by the zoom motor 5 has a macro-photographing function in addition to the zooming function. A rear securing plate 11 of the lens barrel block 1 is secured to the securing portion and has four guide rods 12 secured thereto which extend in parallel around the optical axis. A front securing plate 13 is secured to the front ends of the guide rods 12. Between the front and rear securing plates 11 and 13 is rotatably fitted a cam ring 14 which is provided, on its outer periphery, with a gear 15 secured to the cam ring 14 by set screws (not shown). The gear 15 is directly, or through a gear train (not shown), in mesh with a pinion 7 secured to a drive shaft 5a of the zoom motor 5. The gear 15 is a sector gear which covers the angular displacement of the cam ring 14. The cam ring 14 has zooming cam grooves 20 and 21 for driving the front and rear groups of lenses, respectively.

Rollers 17 and 19 for frames 16 and 18 of the front and rear group of lenses are fitted in the zooming cam grooves 20 and 21, respectively. The front frames 16 and the rear frames 18 are movably fitted to the guide rods 12. A shutter block 23 is secured to the front portion of the front frame 16, and a decoration frame 22 is fitted onto the front frame 16, and the shutter block 23, the decoration frame 22 being secured to the front frame 16 by means of set screws 22a.

The front group of lenses (which will be referred to as a front lens group L1) is held by the front lens frame 24. The front lens frame 24 has an arm 24a which engages with a lens feed lever 23a of the shutter block 23 and a male helicoid 25 which is engaged by a corresponding female helicoid 23c of the shutter block 23, so that when the lens feed lever 23a rotates in the circumferential direction of the shutter block 23, rotating the front lens frame 24, the latter moves in the direction of the optical axis with the help of leads of the helicoid 25.

The rear group of lenses (which will be referred to as a rear lens group L2) is directly connected to a rear lens frame 18.

The shutter block has a pulse motor (not shown) incorporated therein. The pulse motor is adapted to rotate the lens feed lever 23a by an angular displacement in accordance with the distance signals from the object distance measuring device having the light emitter 3 and light receiver 4, so that the shutter (sector), after having been closed, is opened for a predetermined period of time. After that, the shutter is closed again and the lens feed lever 23a is returned to its initial position by the pulse motor.

Figure 3:
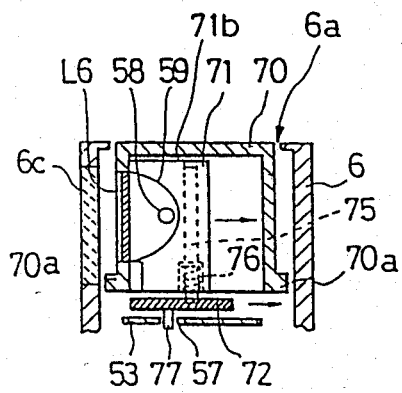
FIG. 3 is a sectional view taken along the line III—III in FIG. 2.
Figure 5:
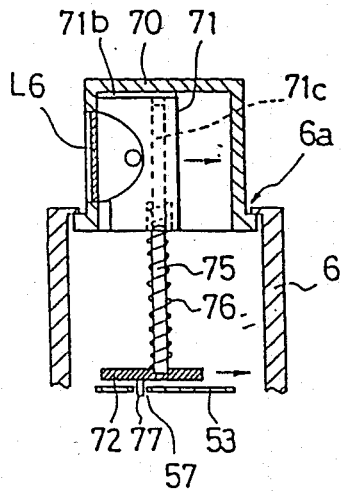
FIG. 5 is a sectional view taken along the line V—V in FIG. 4.

In the illustrated embodiment, the zoom motor 5 is used not only as a drive for the zooming operation but also as a drive for driving the finder device 8 and the strobe device 9 of the finder block 2 in accordance with the zooming operation. In other words, as can be seen in FIGS. 3 and 5, the finder device 8 and the strobe device 9 incorporated in the finder block 2 vary the finder field of view and the illuminating angle (light intensity) of the strobe, in accordance with the change of the focal length of the lens barrel block 1.

The gear 15 of the cam ring 14 is engaged by a pinion 50 which is secured to a shaft 51 which is extended rearward, so that a reduction gear train 52 is provided on the rear end of the shaft 51. A terminal gear 52a of the reduction gear train 52 is engaged by a rack 53a of a cam plate 53.

The cam plate 53 is located below the finder device 8 and the strobe device 9 and is guided by the securing portion so as to move in the right and left hand directions (lateral directions). The cam plate 53 is provided on its rear end with a downward bent portion 53b. The rack 53a is formed integral with the front end (lower end in FIG. 1) of the downward bent portion 53a. The reduction gear train 52 reduces the number of revolutions of the gear 15 and transmits the reduced movement of the cam ring 14 to the cam plate 53. The cam plate 53 has a power (magnification) varying cam groove 55, a parallax correcting cam groove (not shown), and a strobe cam groove 57 for the strobe device 9.

The lens system of the finder device 8 is essentially composed of a stationary lens group L3 on the object side, an eye piece lens group L4, and a movable variable power lens group L5 between the lens groups L3 and L4. The finder device 8 also includes a refractive prism P1 for the macro-photographing mode.

The variable power lens group L5 makes the image plane which varies in accordance with the magnification varying operation of the lens barrel block 1 identical to the field of view by the finder device 8. The prism P1 is brought onto the optical axis only at the macro-photographing mode to correct the parallax between the image place and the finder field of view. In a common lens shutter type of camera, parallax is inevitable because of the separation of the optical axis of the photographing lens from the optical axis of the finder device. The closer the object distance, the larger the parallax. In the illustrated embodiment, since the zoom lens camera has a macro-function, as mentioned above, the parallax tends to become large. In order to avoid the parallax, the refractive prism P1, which is in the form of a wedge having a thinner upper end, is brought onto the optical axis of the finder device to refract the optical axis downward toward the optical axis of the photographing lens to decrease the parallax, so that an object range which is closer to an object range imaged on the film can be viewed by the finder device 8.

The lens group L5 and the prism P1 are housed in a finder frame 60 which has a generally inverted U-shape cross section and which is secured to a camera body 6. The variable power lens group L5 is provided on its opposite side edges with projections 61 which are slidably fitted in corresponding guide grooves 64 formed in the inner faces of the finder frame 60 and parallel with the optical axis for forward and rearward slide movement. The variable power lens group L5 has an association pin 63 on the bottom edge thereof to be fitted in the magnification varying cam groove 55 of the cam plate 53, so that when the cam plate 53 moves in the lateral directions, the variable power lens group L5 moves in accordance with the profile of the magnification varying cam groove 55.

When the variable power lens group L5 moves along the magnification varying cam groove 55, the magnification of the finder optical system; including the object lens group L3, the eye-piece lens group L4, and the variable power lens group L5; varies in accordance with the change of the magnification of the zoom lens, so that the photographing range by the lens barrel block 1 substantially meets the finder field of view. This kind of optical system can be easily realized by a known simple lens design technique.

The strobe device 9, on the one hand, decreases the illuminating angle as the focal length of the photographing lens increases; that is, as the image plane is made small. On the other hand, strobe device 9 increases the illuminating angle at the macro-photographing mode to reduce the amount of light for the object. To this end, in the illustrated embodiment, a Fresnel lens L6 is secured to the front end of a strobe case 70. A light emitter casing 712 in which a xenon lamp 58 and a reflecting shade 59 are incorporated is forward and rearward movably inserted in the strobe case 70. The strobe case 70, which is in the shape of a box with open front and bottom faces, is housed in the camera body 6 so as to move up and down. Thus, strobe case 70 can retractably project from an opening 6a formed in the top face of the camera body 6.

Between the strobe case 70 and the cam plate 53 is provided a supporting bracket 72 which is movable forward and rearward (in the optical axis direction). The supporting bracket 72 is generally L-shaped in front elevation, having a horizontal portion 72a and a vertical portion 72b. The right end of the horizontal portion 72a (FIG. 2) is slidably fitted in a corresponding guide groove 6b which is formed in the camera body in parallel with the optical axis. The horizontal portion 72a is provided on its bottom with two projections 73, 73 which extend in parallel with the optical axis and which are brought into slidable contact with the upper surface of the cam plate 53. The vertical portion 72b of the supporting bracket 72 in FIG. 2 is provided on its left surface with a projection 74 which extends in parallel with the optical axis and which is slidably inserted in a corresponding guide groove 65 formed on the right external surface of the finder frame 60 in parallel with the optical axis, so that the supporting bracket 72 can be guided so as to move forward and rearward along the guide grooves 6b and 65.

The horizontal portion 72a of the supporting bracket 72 is provided on its upper surface with two upward extending supporting rods 75, 75 parallel with each other. The light emitter casing 71 has therein guide holes 71c in which the supporting rods 75 are fitted. The supporting rods 75 have compression springs 76 which surround the same to continuously bias the light emitter casing 71 upward, so that the light emitter casing 71 is supported by the supporting bracket 72 through the supporting rods 75 so as to move together with the supporting bracket 72 in the optical axis direction. The light emitter casing 71 is continuously biased to project upward by the compression springs 76, so that the projections 71b on the top surface of the light emitter casing 71 come into contact with the inner surface of the upper portion of the strobe case 70 to bias the latter upward. As a result, the strobe case 70 continuously tends to project outward from the opening 6a of the camera body 6.

The horizontal portion 72a of the supporting bracket 72 is provided on its bottom with an association pin 77 which is fitted in the strobe cam groove 57 of the cam plate 53, so that when the cam plate 53 moves in the lateral directions (right and left hand directions), the supporting bracket 72 and the light emitter casing 71 moves forward and rearward in accordance with the profile of the strobe cam groove 57.

Figure 2:
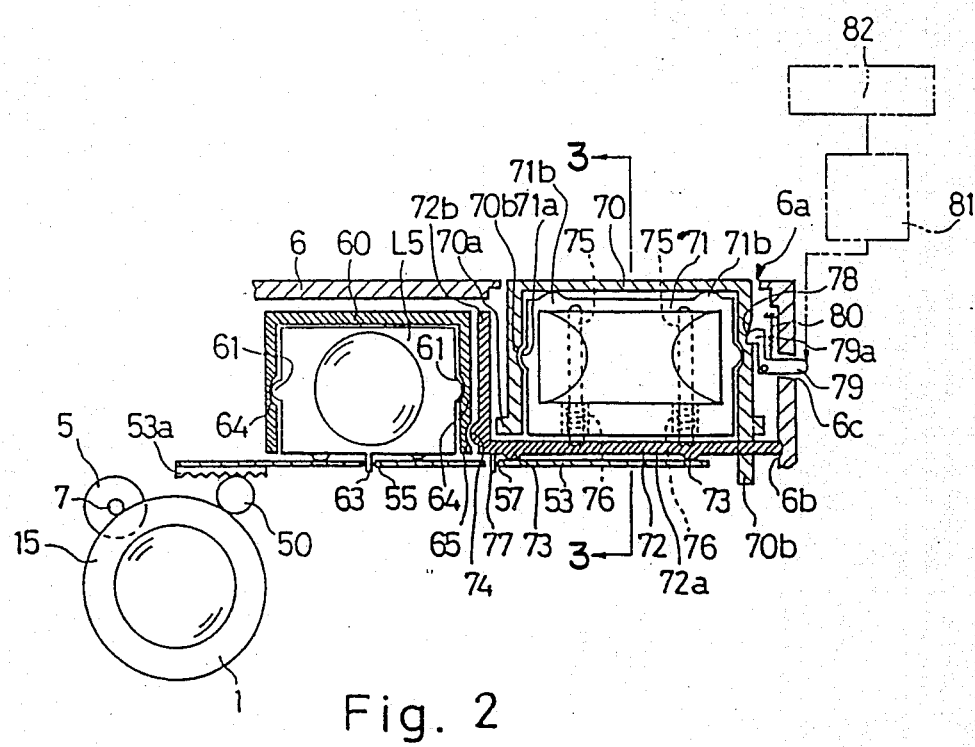
FIG. 2 is a longitudinal sectional view of FIG. 1, with a strobe device shown in a retracted poistion.

In FIG. 2, the strobe case 70 is provided on its right wall portion with an engaging groove (engaging portion) 78 in which a generally L-shaped lock member 79 attached to the side surface of the camera body 6 is engaged. The lock member 79 is pivoted to the camera body 6 at the bent portion of the lock member. The lock member 79 has at its front end a hook 79a which is engaged in the engaging groove 78. The opposite end of the lock member 79 projects outward from a hole 6c formed in the camera body 6. The lock member 79 is continuously biased toward a locked position (received position) in which the hook 79a is engaged in the engaging groove 78 by a tension spring 80 provided between the lock member 79 and the camera body 6. As a result, when the strobe case 70 is received in the retracted position in the camera body 6, the hook 79a is engaged in the engaging groove 78 to occupy the locked position against the spring force of the spring 76 (FIGS. 2 and 3).

Figure 4:
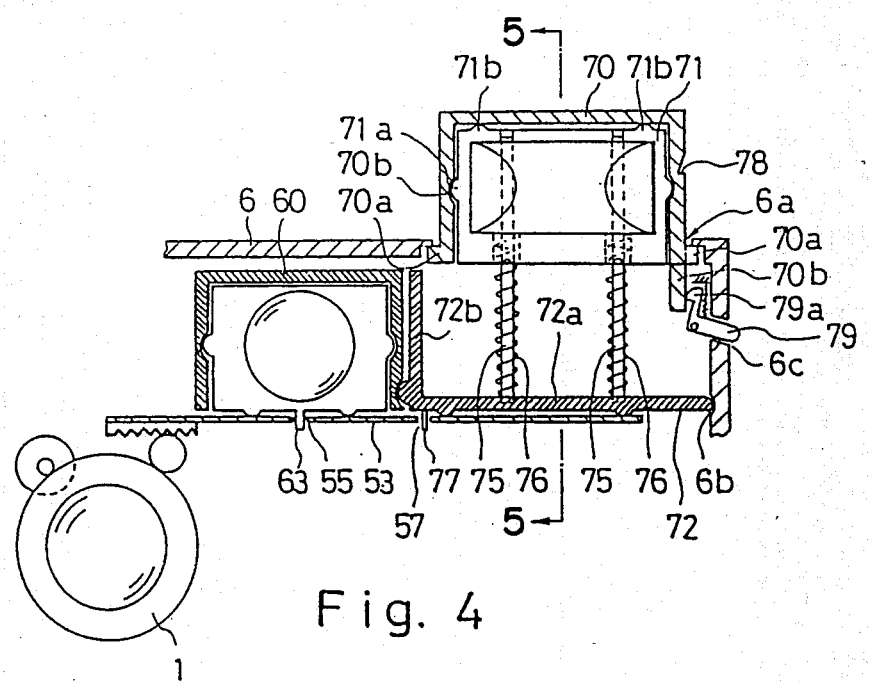
FIG. 4 is a longitudinal sectional view of FIG. 1, with a strobe device shown in a projecting position.

When the lock member 79 is pushed down at its outer end to release the lock, the hook 79a is disengaged from the engaging groove 78, so that the strobe case 70 which is continuously biased to project outward from the opening 6a by the compression spring 76 through the light emitter casing 71 projects outward and upward from the camera body 6 (FIGS. 4 and 5). The projection of the strobe case 70 is restricted by the abutment of a peripheral flange 70a provided on the lower end of the strobe case 70 with the circumferential edge of the opening 6a. Numeral 70b designates a restriction plate which is formed by an extension of the strobe case 70 to prevent the hook 79a from coming below the bottom of the strobe case when the latter projects upward from the opening 6a of the camera body 6.

When the strobe case 70 is pushed down from the projected position into the camera body 6, the hook 79a is automatically engaged again in the engaging groove 78 to maintain the strobe case in the locked position (received position) in the camera body.

The light emitter casing 71 slides on the inner surface of the upper wall of the strobe case 70 forward and rearward together with the supporting bracket 72 which moves in accordance with the right and left movements of the cam plate 53, regardless of the locked position (received position) and the projected position. To decrease the slide friction between the strobe case 70 sand the light emitter casing 71, two round projections 71b which extend in parallel with the optical axis are provided on the upper surface of the light emitter casing 71, so that the light emitter casing 71 comes into slide contact with the inner surface of the upper wall of the strobe case 70 only at the projections 71b with a decreased friction.

The profile of the strobe cam groove 57, as shown by an imaginary line in FIG. 1, corresponds to the profiles of the zooming cam grooves 20 and 21 of the cam ring 14, so that the light emitter casing 71 moves forward and rearward in accordance with the profile of the strobe cam groove 57 when the cam plate 53 moves right and left. The strobe cam grooves 57 have a variable power section and a macro feeding section (neither of which is shown). The variable power section is a section for moving the light emitter casing 71 rearward with respect to the Fresnel lens L6 (FIG. 3), in which the rearward movement of the light emitter casing 71 decreases the illuminating angle of the light from the Fresnel lens L6 and substantially increases the guide number as the focal length increases. The macro feeding section is a section for increasing the illuminating angle to substantially decrease the guide number at the macro-photographing mode.

As can be understood from the above discussion, according to the illustrated embodiment, in a camera having a strobe device 9 in which the light emitter casing 71 moves forward and rearward synchronously with the change of the focal length by the zooming operation to vary the illuminating angle, the light emitter casing 71 projects outward from the camera body 6, so that the light is emitted in a position spaced from the optical axis of the photographing lens, thus resulting in no occurrence of the red-eye phenomenon which would otherwise occur in the strobe-photographing of a figure.

In the illustrated embodiment, although the light is emitted only when the strobe case 70 projects outward from the camera body 6, as mentioned above, it is possible to emit the light also when the strobe case is received (in the received position) in the camera body 6. In this alternative, the portion of the camera body 6 that is opposed to the Fresnel lens L6 is made of a transparent or semitransparent material 6c (FIG. 3).

In the illustrated embodiment, although the lock of the strobe case 70 is released by the manual operation, it is also possible to automatically release the lock when the luminance of the object is small. In this alternative, for example, an electromagnetic actuator 81 which actuates the lock member 79 to release the engagement of the hook 79a in the engaging groove 78 and which is connected to the lock member 79, and a sensor 82 for detecting the luminance of the object are provided in the camera body 6. The electromagnetic actuator 81 is electrically connected to the sensor 82, so that when the sensor 82 detects that the luminance of the object is below a predetermined value, the electromagnetic actuator 81 actuates the lock member 79 to disengage the hook 79a from the engaging groove 78 in accordance with the detection signal of the sensor 82. The disengagement of the hook from the engaging groove automatically releases the lock of the lock member 79.

Note that the present invention can be applied to a camera other than a lens shutter type of camera as mentioned above, e.g. a single-lens reflex lens camera, an electronic camera, a video camera, etc.

As can be understood from the foregoing, in a camera having a zoom lens having a variable power lens group for stepwise or successively varying the focal length, and a variable illuminating angle strobe device having a light emitter which varies the illuminating angle in accordance with change in the focal length of the zoom lens, according to the present invention, since the light emitter is movable between a received position in which it is accomodated in the camera body and a projected position in which the light emitter is offset from the optical axis of the zoom lens, and since the strobe illuminating angle varies in accordance with the change of the focal length of the zoom lens, independently of the occupation of the light emitter in the received position or the projected position, red-eye phenomenon can be prevented by making the strobe ON in the projected position offset from the optical axis of the zoom lens.

I claim:

1. A camera including a variable illuminating angle strobe said camera, comprising a zoom lens which has a group of variable power lenses varying the focal length; a light emitter which has a condenser lens, a light emitting tube and a reflecting shade and which is movable between a received position in which the light emitter is received in a camera body and a projected position in which the light emitter projects from the camera body; and an illuminating angle varying mechanism which varies the relative position of the condenser lens, the light emitting tube or the reflecting shade in accordance with the change of the focal length of the zoom lens to vary the illuminating angle, regardless of the position of the light emitter.

2. A camera according to claim 1, wherein said zoom lens has a group of variable power lenses for stepwise varying the focal length.

3. A camera according to claim 2, further comprising a strobe case to which the condenser lens of the light emitter is secured, and wherein said light emitter comprises a light emitter casing with which the light emitting tube and the reflecting shade are integral and which is movably supported in the strobe case, said strobe case being movable between a received position corresponding to the received position of the light emitter and a projected position corresponding to the projected position of the light emitter, said light emitter casing being displaceable in the strobe case in accordance with the focal length of the zoom lens and being continuously biased in a direction of the projection of the strobe case.

4. A camera according to claim 3, further comprising a supporting bracket for movably supporting the light emitter casing thereon, which is movable on the optical axis direction of the condenser lens in accordance with the focal length of the zoom lens, and spring means for biasing the light emitter casing toward the projected position of the strobe case.

5. A camera according to claim 4, further comprising a cam plate which is movable in accordance with the focal length of the zoom lens and which is associated with the supporting bracket to move the same.

6. A camera according to claim 5, wherein said cam plate has a rack provided thereon which laterally extends with respect to the optical axis of the zoom lens, and wherein said camera further comprises a pinion which is rotated by the zoom motor and which is engaged by the rack of the cam plate to rotate the latter.

7. A camera according to claim 3, further comprising a lock means for locking the strobe case in the received position.

8. A camera according to claim 7, wherein said lock means comprises a lock member which comes into contact with the strobe case when the latter is brought into the received position.

9. A camera according to claim 8, wherein said lock member can be manually operated to release the lock member from the strobe case.

10. A camera according to claim 9, wherein said manual operation can be effected outside the camera body.

11. A camera according to claim 8, further comprising an electromagnetic actuating means for actuating the lock member into the received position.

12. A camera according to claim 11, further comprising a sensor for detecting the luminance of an object to be photographed, so that the electromagnetic actuator is operated to release the lock member from the strobe case in response to the detection signal of the sensor when the luminance is below a predetermined value.

13. A camera according to claim 3, wherein said light emitter casing is provided on its upper outer portion with at least one projection which extends in the direction of the displacement of the light emitter casing and which is brought into contact with the top of the strobe case.

14. A camera according to claim 3, wherein said camera body is provided with a transparent portion which is opposed to the condenser lens of the strobe case located in the received position.

15. A camera according to claim 3, wherein said camera body is provided with a transparent on a semitransparent portion which is opposed to the condenser lens of the strobe case located in the received position.

16. A camera according to claim 2, further comprising a zoom motor for moving the variable power lens group of the zoom lens; a cam plate which is located below the light emitter to laterally move with respect to the optical axis of the zoom lens in association with the power varying operation of the variable power lens group by the zoom motor; a supporting bracket which is provided between the light emitter and the cam plate and which is axially movable in association with the lateral displacement of the cam plate; a strobe case which is provided in the camera body to move up and down so as to partially project from the camera body through an opening formed on the camera body and which has a condenser lens secured to the front portion of the strobe case; a light emitter casing which is movable in the strobe case and which has a light emitting tube and a light reflecting shade, both integral with the light emitter casing; said supporting bracket being provided with supporting rods which support the light emitter casing for the upward and downward movement of the light emitter casing; a spring means for biasing the light emitter casing toward the projected position, said light emitter casing being continuously pressed against a top of the strobe case; and a lock member which comes into engagement with the strobe case to lock the same in the received position when the strobe case is received in the received position against the spring means.

17. A camera according to claim 1, wherein said zoom lens has a group of variable power lenses for successively varying the focal length.

18. A camera according to claim 17, further comprising a strobe case to which the condenser lens of the light emitter is secured, and wherein said light emitter comprises a light emitter casing with which the light emitting tube and the reflecting shade are integral and which is movably supported in the strobe case, said strobe case being movable between a received position corresponding to the received position of the light emitter and a projected position corresponding to the projected position of the light emitter, said light emitter casing being displaceable in the strobe case in accordance with the focal length of the zoom lens and being continuously biased in a direction of the projection of the strobe case.

19. A camera according to claim 18, further comprising a supporting bracket for movably supporting the light emitter casing thereon, which is movable on the optical axis direction of the condenser lens in accordance with the focal length of the zoom lens, and spring means for biasing the light emitter casing toward the projected position of the strobe case.

20. A camera according to claim 19, further comprising a cam plate which is movable in accordance with the focal length of the zoom lens and which is associated with the supporting bracket to move the same.

21. A camera according to claim 20, wherein said cam plate has a rack provided thereon which laterally extends with respect to the optical axis of the zoom lens, and wherein said camera further comprises a pinion which is rotated by the zoom motor and which is engaged by the rack of the cam plate to rotate the latter.

22. A camera according to claim 18, further comprising a lock means for locking the strobe case in the received position.

23. A camera according to claim 22, wherein said lock means comprises a lock member which comes into contact with the strobe case when the latter is brought into the received position.

24. A camera according to claim 23, wherein said lock member can be manually operated to release the lock member from the strobe case.

25. A camera according to claim 24, wherein said manual operation can be effected outside the camera body.

26. A camera according to claim 25, further comprising an electromagnetic actuating means for actuating the lock member into the received position.

27. A camera according to claim 26, further comprising a sensor for detecting the luminance of an object to be photographed, so that the electromagnetic actuator is operated to release the lock member from the strobe case in response to the direction signal of the sensor when the luminance is below a predetermined value.

28. A camera according to claim 18, wherein said light emitter casing is provided on its upper outer portion with at least one projection which extends in the direction of the displacement of the light emitter casing and which is brought into contact with the top of the strobe case.

29. A camera according to claim 18, wherein said camera body is provided with a transparent portion which is opposed to the condenser lens of the strobe case located in the received position.

30. A camera according to claim 18, wherein said camera body is provided with a transparent on a semitransparent portion which is opposed to the condenser lens of the strobe case located in the received position.

31. A camera according to claim 17, further comprising a zoom motor for moving the variable power lens group of the zoom lens; a cam plate which is located below the light emitter to laterally move with respect to the optical axis of the zoom lens in association with the power varying operation of the variable power lens group by the zoom motor; a supporting bracket which is provided between the light emitter and the cam plate and which is axially movable in association with the lateral displacement of the cam plate; a strobe case which is provided in the camera body to move up and down so as to partially project from the camera body through an opening formed on the camera body and which has a condenser lens secured to the front portion of the strobe case; a light emitter casing which is movable in the strobe case and which has a light emitting tube and a light reflecting shade, both integral with the light emitter casing; said supporting bracket being provided with supporting rods which support the light emitter casing for the upward and downward movement of the light emitter casing; a spring means for biasing the light emitter casing toward the projected position, said light emitter casing being continuously pressed against a top of the strobe case; and a lock member which comes into engagement with the strobe case to lock the same in the received position when the strobe case is received in the received position against the spring means.

* * * * *